(12) United States Patent
Ryu

(10) Patent No.: US 10,156,836 B2
(45) Date of Patent: Dec. 18, 2018

(54) PROGRAMMABLE LOGIC CONTROLLER

(71) Applicant: LSIS CO., LTD., Anyang-si, Gyeonggi-do (KR)

(72) Inventor: Hwa-Soo Ryu, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/874,092

(22) Filed: Jan. 18, 2018

(65) Prior Publication Data
US 2018/0329387 A1 Nov. 15, 2018

(30) Foreign Application Priority Data
May 11, 2017 (KR) .................. 10-2017-0058668

(51) Int. Cl.
*G05B 19/05* (2006.01)
*H04B 3/04* (2006.01)
*G06F 13/24* (2006.01)

(52) U.S. Cl.
CPC ............ *G05B 19/05* (2013.01); *G06F 13/24* (2013.01); *H04B 3/04* (2013.01); *G05B 2219/10* (2013.01); *G08C 2200/00* (2013.01)

(58) Field of Classification Search
CPC .... G05B 19/05; G05B 19/054; G05B 19/056; G05B 19/058; G06F 13/10; G06F 13/20; G06F 13/24
See application file for complete search history.

(56) References Cited

U.S. PATENT DOCUMENTS

| 9,084,231 | B2 | 7/2015 | Li et al. |
| 2003/0005196 | A1 | 1/2003 | Reed |
| 2004/0215354 | A1* | 10/2004 | Nakamura ............... G05B 9/02 700/21 |
| 2007/0176732 | A1* | 8/2007 | Humpert ............. G05B 19/058 340/3.44 |

(Continued)

FOREIGN PATENT DOCUMENTS

| EP | 2464026 A1 | 6/2012 |
| KR | 1019990062456 A | 7/1999 |
| KR | 100385159 B1 | 8/2003 |

(Continued)

OTHER PUBLICATIONS

European Search Report for related European Application No. 18151845.7; action dated Aug. 2, 2018; (8 pages).

(Continued)

*Primary Examiner* — Jason M Crawford
(74) *Attorney, Agent, or Firm* — K&L Gates LLP

(57) ABSTRACT

The PLC according to the present disclosure includes a control module configured to perform a control operation according to a preset program; a first communication module configured to transmit a control command from the control module to at least one of first external devices; and a second communication module configured to transmit the control command from the control module to at least one of second external devices, wherein the first and second communication modules transmit external data to the control module via a data transmission cable which is shared with each other, and check interrupt signals therebetween to alternately transmit the external data to the control module, respectively.

7 Claims, 4 Drawing Sheets

(56) References Cited

U.S. PATENT DOCUMENTS

2014/0200684 A1\* 7/2014 Mizutani ................ G05B 19/05
 700/23
2016/0266563 A1\* 9/2016 Mizutani ................ G05B 19/05

FOREIGN PATENT DOCUMENTS

KR 20060080380 A 7/2006
KR 100790747 B1 1/2008

OTHER PUBLICATIONS

Korean Office Action for related Korean Application No. 10-2017-0058668; action dated Sep. 18, 2018; (4 pages).

\* cited by examiner

PROGRAMMABLE LOGIC CONTROLLER

CROSS-REFERENCE TO RELATED APPLICATIONS

Pursuant to 35 U.S.C. § 119(a), this application claims the benefit of earlier filing date and right of priority to Korean Patent Application No. 10-2017-0058668 filed on May 11, 2017, in the Korean Intellectual Property Office, the disclosure of which is hereby incorporated by reference in its entirety.

BACKGROUND

1. Technical Field

The present disclosure relates to a programmable logic controller (PLC) capable of minimizing a configuration of a data transmission cable between a control module and a plurality of communication modules by allowing a plurality of communication modules to check interrupt signals therebetween and then transmit data without collision through a data transmission cable which is shared by the plurality of communication modules.

2. Description of the Related Art

A programmable logic controller (PLC) is mainly used to perform functions such as a logic operation, sequencing, timing, counting, and an arithmetic operation through digital or analog input/output (I/O) modules. Such a PLC is a device configured to control various machines or processors using a programmable memory, and is widely used in various industries for factory automation and the like.

The PLC sequentially processes input signals from the outside through a preset program, and controls an external device connected to the PLC using the processed result.

To this end, the PLC is configured to include a control module, a communication module, an I/O module, a communication line, and the like, and the PLC sequentially executes preset programs using a microprocessor or a micro control unit of the control module to control the connected external device using the processed result.

Specifically, the control module sequentially executes programs pre-programmed in a preset operating system using a central processing unit (CPU) including a microprocessor or a micro controller unit (MCU). Further, the control module supplies control signals to external devices through the at least one communication module, and receives to store operation result data from the external devices.

However, in a conventional PLC, communication lines (e.g., data transmission cables) are connected one-to-one between a control module and a plurality of communication modules, so that there is a problem in that a line connection configuration between the control module and the plurality of communication modules is complicated. Specifically, in order to connect the communication lines to each other between the control module and the plurality of communication modules, there are problems in that a plurality of communication ports should be configured in the control module, and the communication lines should be separately configured therein.

Consequently, a configuration has been conventionally proposed in which the control module and the plurality of communication modules may share a communication line to transmit data using a single communication line. However, when the communication line is shared, since the plurality of communication modules should transmit data alternately according to a predetermined transmission period and a predetermined transmission order, there is a problem in that data transmission is delayed until a next transmission cycle arrives. Further, since data transmission should be stopped, and a next transmission should be started according to the predetermined transmission order even when the data is currently transmitted, there is also a problem in that data transmission error occurs.

There is proposed a method in which, when one communication module is transmitting data to a control module, another communication module checks the one communication module that is transmitting the data by a predetermined transmission period, and transmits data when the one communication module terminates transmission of the data to the control module. However, this method causes a problem in that a communication module which transmits a lot of data or transmits data for a long time to almost occupy a communication line and thus a communication module with a small amount of data transmission cannot transmit data by checking only a predetermined transmission period such that an error occurs in an operation of equipment.

SUMMARY

Therefore, it is an object of the present disclosure to provide a programmable logic controller (PLC) capable of minimizing a configuration of a data transmission cable between a control module and a plurality of communication modules by allowing a plurality of communication modules to check interrupt signals therebetween and then transmit data without collision through a data transmission cable which is shared by the plurality of communication modules.

Further, it is another object of the present disclosure to provide a PLC in which each of the plurality of communication modules monitors an interrupt signal therebetween and transmits data only when data can be transferred, and, when one communication module transmits data, the one communication module is able to disable data transmission of another communication module by applying an interrupt signal to another communication module.

In accordance with one aspect of the present disclosure, there is provided a programmable logic controller (PLC) including a control module configured to perform a control operation according to a preset program; a first communication module configured to transmit a control command from the control module to at least one of first external devices; and a second communication module configured to transmit the control command from the control module to at least one of second external devices, wherein the first and second communication modules transmit external data to the control module via a data transmission cable which is shared with each other, and check interrupt signals therebetween to alternately transmit the external data to the control module, respectively.

In accordance with the PLC according to the embodiment of the present disclosure, a plurality of communication modules can transmit data without collision through a data transmission cable shared with each other by checking interrupt signals between the plurality of communication modules. Accordingly, a configuration of the data transmission cable between a control module and the plurality of communication modules can be minimized to simplify an interface structure therebetween and reduce manufacturing costs of the PLC.

Further, data is transmitted only when data transmission is possible while each of the plurality of communication modules monitors the interrupt signals between the plurality of communication modules, and, when the data is transmitted, one communication module applies an interrupt signal to another communication module to disable data transmission of another communication module. Therefore, data collision can be prevented, and occurrence of an error can be minimized to improve reliability of the PLC.

DETAILED DESCRIPTION

Figure 1:
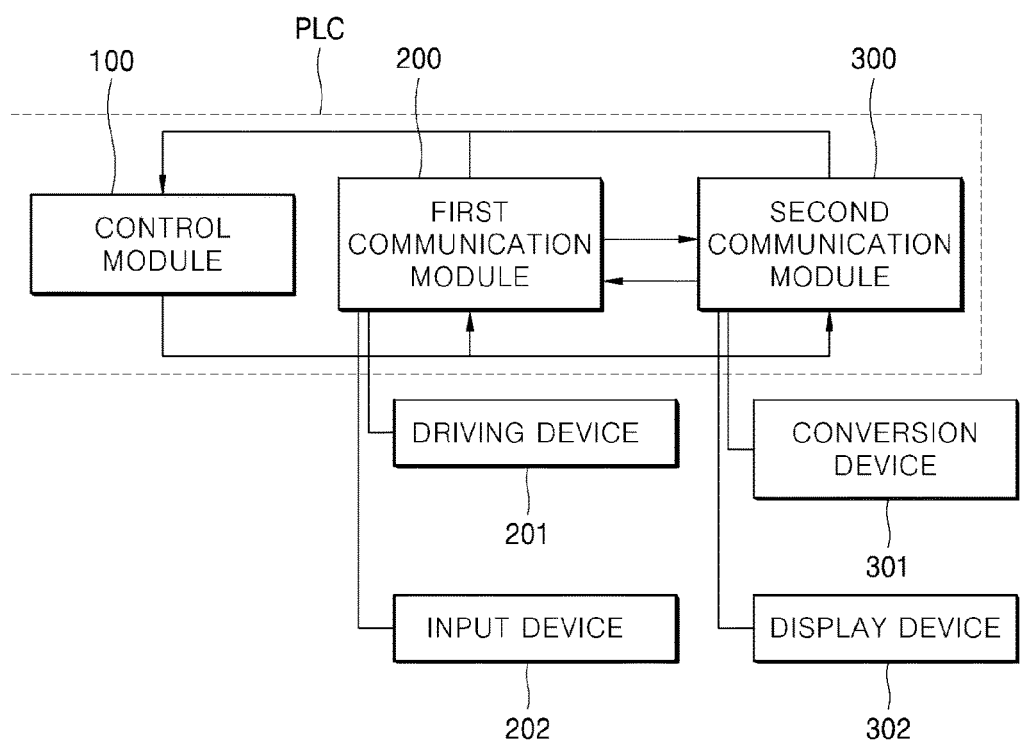
FIG. 1 is a configuration block diagram illustrating in detail a programmable logic controller (PLC) according to an embodiment of the present disclosure.

The present disclosure may be modified in various forms and may have a variety of embodiments, and, therefore, specific embodiments will be illustrated in the drawings and a description thereof will be described in the following detailed description. The embodiments to be disclosed below, however, are not to be taken in a sense which limits the present disclosure to specific embodiments, and should be construed to include modification, equivalents, or substitutes within the spirit and technical scope of the present disclosure.

In order to fully convey a configuration and an effect of the present disclosure, preferred embodiments of the present disclosure will be described with reference to the accompanying drawings. However, the present disclosure is not limited to the embodiments described below, but may be implemented in various forms and various modifications may be made. However, the description of the present embodiment is intended to provide a complete disclosure of the present disclosure and to fully disclose the scope of the present disclosure to a person ordinary skilled in the art to which the present disclosure belongs. In the accompanying drawings, components are enlarged in size for convenience of description, and a scale of each of the components can be exaggerated or reduced.

When a component is described as being "on" or "in contact" with other component, the component may be in direct contact with or be connected to the other component, and it should be construed that another component may be present between the component and the other component. On the other hand, when a component is described as being "directly on" or "in direct contact" with other element, it may be understood that no another component is present between the component and the other component. Other expressions that describe the relationship between components, for example, "between" and "directly between" may be similarly interpreted as described above.

The terms "first," "second," and the like can be used to describe various components, but the components should not be limited by these terms. These terms may be used only for the purpose of distinguishing one component from another component. For example, without departing from the scope of the present disclosure, a first component may be referred to as a second component, and similarly, the second component may also be referred to as the first component.

The singular form includes the plural form unless the context clearly notes otherwise. In this description, the terms "comprising," "having," or the like are used to specify that a feature, a number, a step, an operation, a component, an element, or a combination thereof described herein exists, and they do not preclude the presence or addition of one or more other features, numbers, steps, operations, components, elements, or combinations thereof.

The above and other objectives, features, and advantages of the present disclosure will be described in detail with reference to the accompanying drawings, and therefore, the technical spirit of the present disclosure can be easily implemented by those skilled in the art. Also, in the following description of the present disclosure, if a detailed description of the known related art is determined to obscure the gist of the present disclosure, the detailed description thereof will be omitted. Hereinafter, preferred embodiments of the present disclosure will be described in detail with reference to the accompanying drawings.

FIG. 1 is a configuration block diagram illustrating in detail a programmable logic controller (PLC) according to an embodiment of the present disclosure.

A PLC shown in FIG. 1 includes a control module 100 configured to perform a control operation according to a preset program, a first communication module 200 configured to transmit a control command from the control module 100 to at least one of first external devices 201 and 202, and a second communication module 300 configured to transmit the control command from the control module 100 to at least one of second external devices 301 and 302.

The control module 100 is provided with a single data receiving port, and alternately receives external data from the first and second communication modules 200 and 300 through a data transmission cable connected to the single data receiving port.

The control module 100 includes a central processing unit (CPU) provided with at least one of a microprocessor, a micro controller unit (MCU), a microcomputer, and the like. Accordingly, the control module 100 controls driving of at least one of the first and second external drives 201, 202, 301, and 302 according to the result of program execution (e.g., a program operation process) based on a real-time operating system of the CPU.

Specifically, the control module 100 processes internal data required for a control operation of the PLC through a program operation process which is preset and stored in advance. According to the processed result of the internal data, the control module 100 supplies a control signal and a control command to the first or second communication module 200 or 300. Consequently, the control signal or the control command is transmitted to the first or second external drives 201 and 202, or 301 and 302 through the first or second communication module 200 or 300.

The first communication module 200 transmits external data from the first external devices 201 and 202 to the control module 100 through the data transmission cable shared with the second communication module 300. At this point, the first communication module 200 checks an interrupt signal mutually with the second communication module 300, and alternately transmits the external data to the control module 100 according to the interrupt signal. Here, the interrupt signal is a signal indicating that data is being transmitted by occupying the data transmission cable shared by the first and second communication modules 200 and 300.

Consequently, when the interrupt signal is being input from the second communication module 300, the first communication module 200 determines that the second communication module 300 occupies the data transmission cable to transmit data to wait without transmitting the external data to the control module 100. Then, when the interrupt signal is not being input from the second communication module 300 while the first communication module 200 monitors the interrupt signal input from the second communication module 300, the first communication module 200 generates and transmits an interrupt signal to the second communication module 300. Consequently, while generating and transmitting the interrupt signal to the second communication module 300, the first communication module 200 may transmit the external data from the first external devices 201 and 202 to the control module 100.

On the other hand, the second communication module 300 may also transmit external data from the second external devices 301 and 302 to the control module 100 through the data transmission cable shared with the first communication module 200. At this point, the second communication module 300 checks the interrupt signal mutually with the first communication module 200, and alternately transmits the external data to the control module 100 according to the interrupt signal.

Specifically, when the interrupt signal is being input from the first communication module 200, the second communication module 300 waits without transmitting the external data to the control module 100, and monitors the interrupt signal input from the first communication module 200. Thereafter, when the interrupt signal is not being inputted from the first communication module 200, the second communication module 300 generates and transmits an interrupt signal to the first communication module 200. Consequently, while generating and transmitting the interrupt signal to the first communication module 200, the second communication module 300 may transmit the external data from the second external devices 301 and 302 to the control module 100.

At least one of the first external devices 201 and 202 may include a driving device 201 such as a motor, a turbine, a generator, or the like, and may be configured to further include an input device 202 such as a switch, a monitor, a keypad, or the like.

At least one of the second external devices 301 and 302 may include a conversion device 301 such as an alternating-current (AC)/direct-current (DC) converter, a DC/DC converter, a DC/AC converter, an amplifier, or the like, and may be configured to further include a display device 302 such as an image display pad, a monitor, a mobile communication terminal, a computer, or the like.

Figure 2:
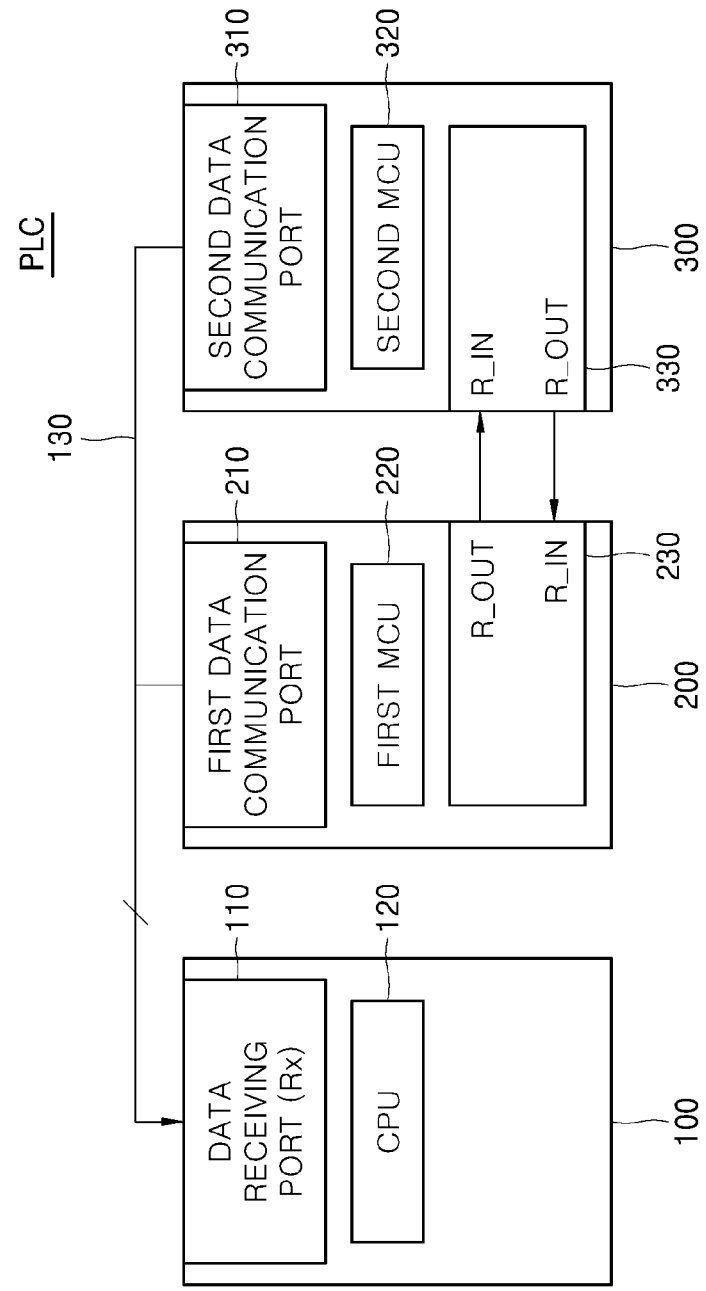
FIG. 2 is a configuration block diagram illustrating in detail structures of a control module and first and second communication modules which are shown in FIG. 1.

FIG. 2 is a configuration block diagram illustrating in detail structures of the control module 100 and the first and second communication modules 200 and 300 which are shown in FIG. 1.

Referring to FIG. 2, the control module 100 includes a single data receiving port (Rx) 110 electrically connected to the data transmission cable 130 and configured to receive external data from the first and second communication modules 200 and 300; and a CPU 120 configured to store the external data input through the single data receiving port (Rx) 110, execute preset programs using the external data, and provide a control command to the first or second communication modules 200 or 300, thereby controlling the first or second external devices 201 and 202, or 301 and 302.

Accordingly, the CPU 120 receives the external data from the first and second communication modules 200 and 300, and processes internal data required for a control operation of the PLC through a program operation process which is preset and stored in advance. Further, according to the processed result of the internal data, the CPU 120 generates a control signal or a control command and transmits the control signal or the control command to the first and second communication modules 200 and 300 through a separate data transmission port (not shown).

The first and second communication modules 200 and 300 provide the first and second external drives 201, 202, 301, and 302 with the control signal or the control command from the control module 100, respectively.

To this end, the first communication module 200 includes a first data communication port 210, a first interrupt port 230, and a first MCU 220.

The first data communication port 210 is electrically connected to the data transmission cable 130 and transmits the external data through the data transmission cable 130.

The first interrupt port 230 receives an interrupt signal from the second communication module 300, or generates an interrupt signal and supplies the interrupt signal to the second communication module 300. The interrupt signal is a signal indicating that data is being transmitted by occupying the data transmission cable 130 shared by the first and second communication modules 200 and 300. Accordingly, when the interrupt signal is not being input from the second communication module 300, the first interrupt port 230 generates an interrupt signal and transmits the interrupt signal to the second communication module 300 under the control of the first MCU 220. Consequently, while generating and transmitting the interrupt signal to the second communication module 300, the first communication module 200 may transmit the external data from the first external devices 201 and 202 to the control module 100.

The first MCU 220 monitors the interrupt signal input from the second communication module 300 through the first interrupt port 230, or generates an interrupt signal to supply the interrupt signal to the second communication module 300. Further, the first MCU 220 controls the external data to be transmitted to the data transmission cable 130 through the first data communication port 210.

When the interrupt signal generated by the second communication module 300 is input to the first interrupt port 230, the first MCU 220 waits without transmitting the external data to the first data communication port 210, and continuously monitors the interrupt signal input from the second communication module 300.

Thereafter, when the interrupt signal from the second communication module 300 is not input to the first interrupt port 230, the first MCU 220 generates an interrupt signal to transmit the interrupt signal to the second communication module 300 through the first interrupt port 230. Thus, while generating and transmitting the interrupt signal to the second communication module 300, the first MCU 220 may provide the external data from the first external devices 201 and 202 to the first data communication port 210, thereby allowing the external data to be transmitted to the control module 100.

The second communication module 300 includes a second data communication port 310, a second interrupt port 330, and a second MCU 320.

The second data communication port 310 is electrically connected to the data transmission cable 130, and transmits the external data to be transmitted through the data transmission cable 130.

The second interrupt port 330 receives an interrupt signal from the first communication module 200, or generates an interrupt signal to supply the interrupt signal to the first communication module 200. When the interrupt signal is not inputted from the first interrupt port 230, the second interrupt port 330 generates an interrupt signal to supply the interrupt signal to the first interrupt port 230 under the control of the second MCU 320. As described above, while generating and transmitting the interrupt signal to the first interrupt port 230, the second MCU 320 may transmit the external data to the control module 100.

The second MCU 320 monitors the interrupt signal input from the first communication module 200 through the second interrupt port 330 or generates an interrupt signal to supply the interrupt signal to the first communication module 200, and controls the external data to be transmitted to the data transmission cable 130 through the second data communication port 310.

When the interrupt signal generated by the first communication module 200 is input to the second interrupt port 330, the second MCU 320 waits without transmitting the external data to the second data communication port 310, and monitors the interrupt signal input from the first communication module 200.

Thereafter, when the interrupt signal from the first communication module 200 is not input to the second interrupt port 330, the second MCU 320 generates an interrupt signal to transmit the interrupt signal to the first communication module 200 through the second interrupt port 330. Thus, while generating and transmitting the interrupt signal to the first communication module 200, the second MCU 320 may provide the external data from the second external devices 301 and 302 to the second data communication port 310, thereby allowing the external data to be transmitted to the control module 100.

Figure 3:
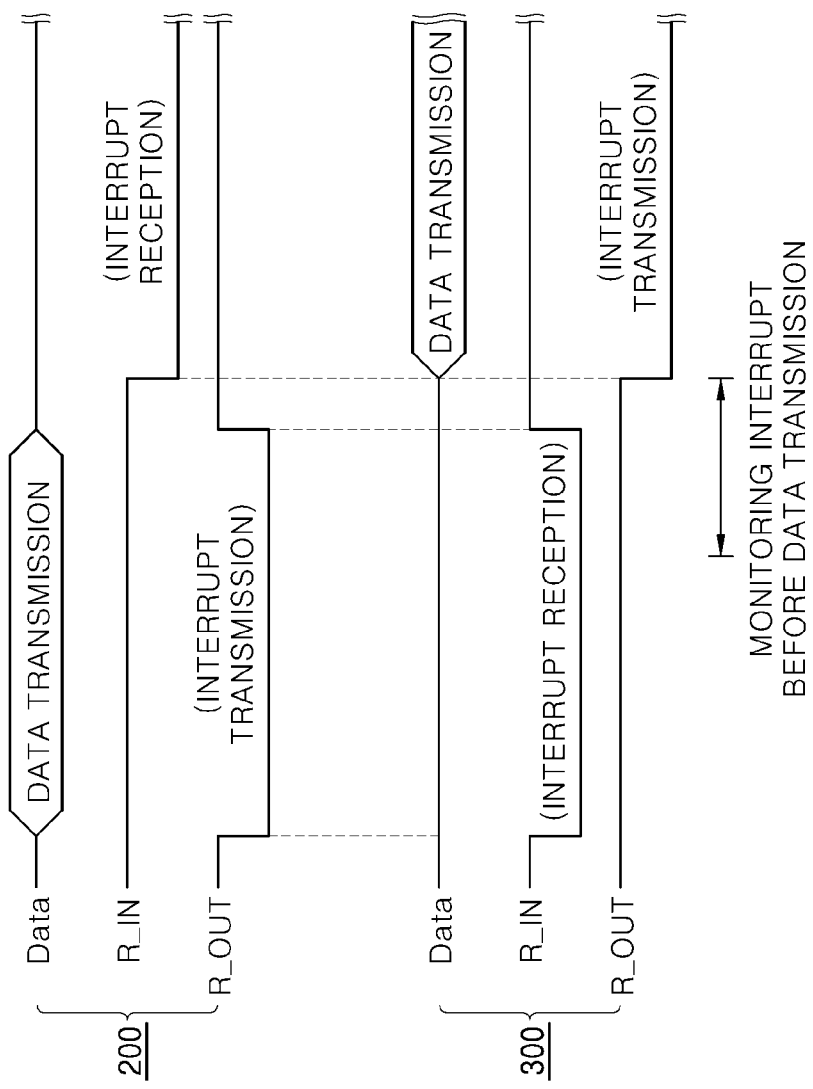
FIG. 3 is an input/output (I/O) waveform diagram for sequentially describing data transmission operations of the first and second communication modules shown in FIG. 2.

FIG. 3 is an input/output (I/O) waveform diagram for sequentially describing data transmission operations of the first and second communication modules 200 and 300 shown in FIG. 2.

Referring to FIG. 3, the data transmission operations of the first and second communication modules 200 and 300 will be described in more detail below.

When an interrupt signal generated at a low logic level in the second communication module 300 is being input to an input channel R_IN of the first interrupt port 230, the first communication module 200 waits without transmitting the external data to the first data communication port 210. Then, the first communication module 200 continuously monitors the interrupt signal input from the second communication module 300.

Thereafter, when the interrupt signal from the second communication module 300 is disabled to a high logic level at the input channel R_IN of the first interrupt port 230, the first communication module 200 generates an interrupt signal at a low logic level to output the interrupt signal to the second communication module 300 through an output channel R_OUT of the first interrupt port 230 (an interrupt transmission operation).

Thus, while the interrupt signal is generated at the low logic level and is transmitted to the second communication module 300 (the interrupt transmission operation), the first MCU 220 may provide the external data from the first external devices 201 and 202 to the first data communication port 210, thereby allowing the external data to be transmitted to the control module 100 (a data transmission operation).

On the other hand, when the interrupt signal generated at the low logic level in the first communication module 200 is being input through an input channel R_IN of the second interrupt port 330, the second communication module 300 waits without transmitting the external data to the second data communication port 310. Further, the second communication module 300 monitors the interrupt signal input from the first communication module 200 (an interrupt monitoring operation before data transmission).

Thereafter, when the interrupt signal from the first communication module 200 is changed to a high logic level instead of being input to the input channel R_IN of the second interruption port 330 at the low logic level, the second communication module 300 generates an interrupt signal at the low logic level to transmit the interrupt signal to the first communication module 200 through an output channel R_OUT of the second interrupt port 330. Thus, while the interrupt signal is generated at the low logic level and is transmitted to the first communication module 200, the second MCU 320 may provide the external data from the second external devices 301 and 302 to the second data communication port 310, thereby allowing the external data to be transmitted to the control module 100.

Figure 4:
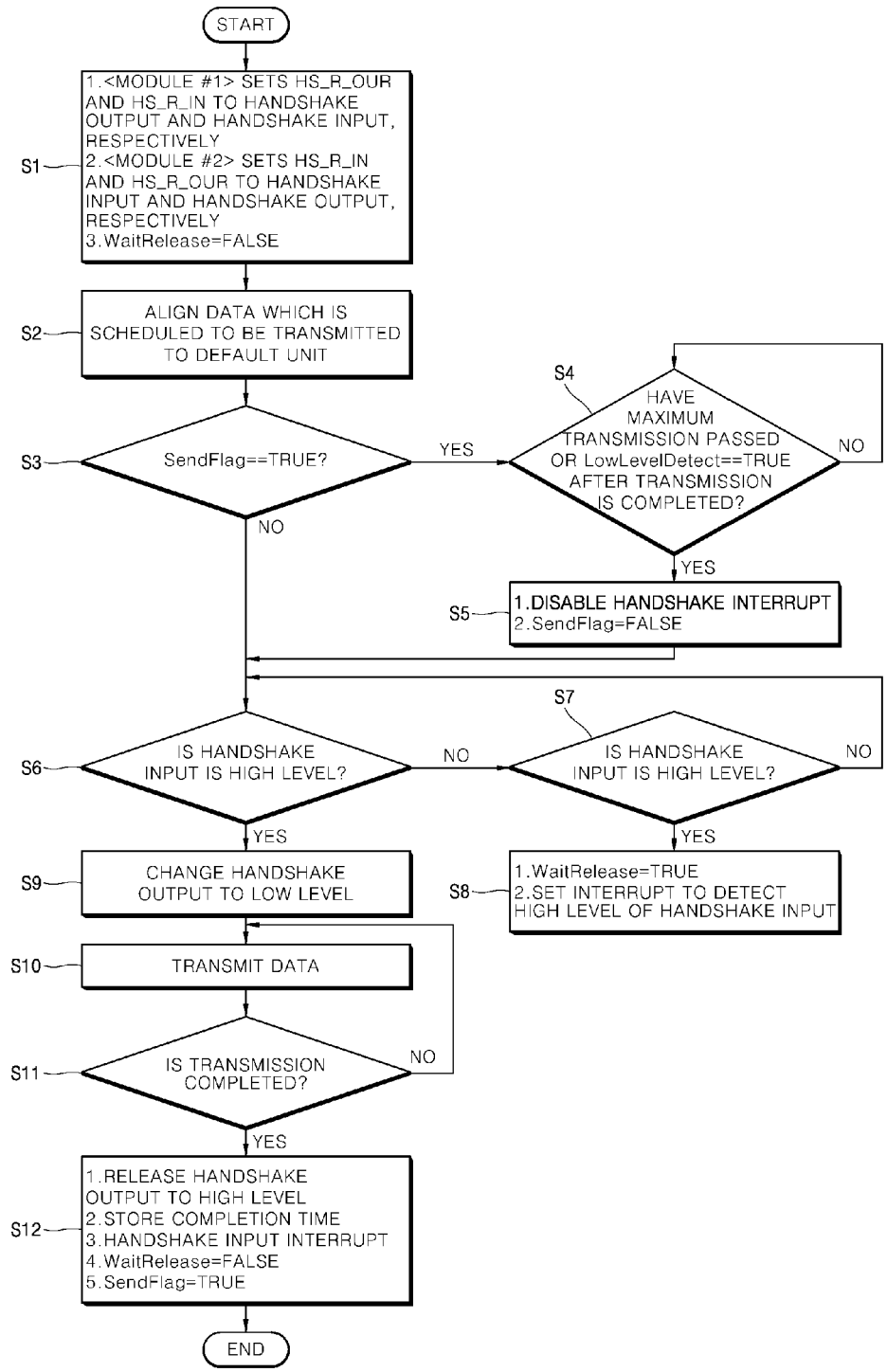
FIG. 4 is a flowchart for describing a method of driving the PLC shown in FIGS. 1 and 2.

FIG. 4 is a flowchart for describing a method of driving the PLC shown in FIGS. 1 and 2.

Referring to FIG. 4, when the first communication module 200 starts to be driven, the first communication module 200 first sets the input channel R_IN and the output channel R_OUT of the first interrupt port 230. Similarly, when the second communication module 300 starts to be driven, the second communication module 300 first sets the input channel R_IN and the output channel R_OUT of the second interrupt port 330 (S1).

The input/output channel setting operation of each of the first interrupt port 230 and the second interrupt port 330 is an operation for setting a handshake input/output order by setting the input channel R_IN and the output channel R_OUT to be able to receive and transmit an interrupt signal therethrough, respectively.

A handshake input/output method is one of data transmission methods in which each of a plurality of communication modules configured to input and output data can alternately transmit data in order. However, since a data transmission order can be arbitrarily changed according to data capacity or fairness among communication modules, the data transmission order may be set in various ways. Accordingly, the present disclosure is implemented such that the first communication module 200 and the second communication module 300 generate interrupt signals while transmitting data, and mutually monitor the interrupt signals to perform a handshake input/output communication method.

Thus, in order to perform a handshake input/output communication, the first communication module 200 and the second communication module 300 should monitor an interrupt signal between the first interrupt port 230 and the second interrupt port 330 and sequentially perform input and output operations according to whether the interrupt signal is generated.

After setting the input channel R_IN and the output channel R_OUT, when data to be transmitted to the control module 100 is present, each of the first communication module 200 and the second communication module 300 may monitor an interrupt signal, which is being inputted thereto, and generate an interrupt signal to transmit the data at the time when the interrupt signal is not being input.

Accordingly, when data to be transmitted to the control module 100 is present, each of the first communication module 200 and the second communication module 300 first aligns external data which is scheduled to be transmitted to the control module 100 (S2), and then monitors the interrupt signal which is being input. That is, one party monitors an interrupt signal of the other party in a wait state (SendFlag==TRUE) (S3) when the external data, which is scheduled to be transmitted to the control module 100, is present but the other party first generates an interrupt signal and occupies the data transmission cable 130 to transmit data to the control module 100.

Specifically, when data to be transmitted is present, data to be sent is present, a maximum transmission time passed, or a state is set to be in a state before the interrupt signal is generated (LowLevelDetect==TRUE), the one party is directed to check whether the other party occupies a handshake (SendFlag==FALSE) (S4). In this case, since the one party cannot continuously monitor and wait a time when the other party releases the occupation of the data transmission cable 130, the one party sets a data transmission wait (WaitRelease==TRUE) and an interrupt signal wait (LowLevelDetect==TRUE). Then, the one party detects a time of occupation release of the data transmission cable 130 by the other party (S5).

The external data, which is scheduled to be transmitted, is present in the first or second communication module 200 or 300 until interrupt signal determination operations (S3 to S5), and, when one of the first and second communication modules 200 and 300 has a control right (i.e., the input channel R_IN is in a "low logic level"), there is a flag for immediately recognizing a time when the other party terminates the transmission of the external data and the input channel R_IN is switched from the low logic level to a high logic level using the interrupt signal, and for setting the control right.

Thereafter, while monitoring that the other party releases the occupation of the data transmission cable 130 (S6 and S7), the one party maintains the data transmission wait (WaitRelease==TRUE) and an interrupt signal wait (LowLevelDetect==TRUE) until whether the data transmission cable 130 is occupied is determined (S8).

However, while monitoring that the other party releases the occupation of the first data communication port 210 (S6 and S7), when the other party is determined to release the occupation of the data transmission cable 130, the one party generates an interrupt signal to transmit the interrupt signal to the input channel R_IN of the other party (S9).

In handshake input interrupt process operations (S9 and S10), the first or second communication module 200 or 300 converts and sets the interrupt signal, which is a handshake output, to a high or low logic level. That is, in the handshake input interrupt process operations (S9 and S10), the first or second communication module 200 or 300 monitors whether the interrupt signal is generated between the first and second communication modules 200 and 300, and, when either the first communication module 200 or the second communication module 300 does not occupy the data transmission cable 130, a process in which the first or second communication module 200 or 300 first occupies the data transmission cable 130 may be repeated.

The handshake input interrupt process operations (S6 to S10) for the repeated processes of occupying the data transmission cable 130 will be replaced with the description of the data transmission operations of the first and second communication modules 200 and 300, which has been described with reference to FIG. 3.

Then, in transmission confirmation and completion operations (S11 and S12), after the external data transmission is completed, a handshake input interrupt signal detects the interrupt signal of a high or low logic level to allow an interrupt to be generated. In other words, until termination of the handshake input interrupt process operations, the handshake method is repeated and maintained.

As described above, the PLC according to the embodiment of the present disclosure allows a plurality of communication modules to transmit data without collision through a data transmission cable shared with each other by mutually checking interrupt signals, so that there is an effect in which a configuration of the data transmission cable between a control module and the plurality of communication modules can be minimized to simplify a structure of the data transmission cable and reduce manufacturing costs.

Further, data is transmitted only when data transmission is possible while each of the plurality of communication modules monitors the interrupt signals between the plurality of communication modules, and, when the data is transmitted, one communication module applies an interrupt signal to another communication module to disable data transmission of another communication module, so that there is effect in which data collision can be prevented and an error can be minimized to improve reliability of the PLC.

While the present disclosure has been particularly shown and described with reference to exemplary embodiments thereof, the present disclosure is not limited to the exemplary embodiments, and it should be understood that various alternations and modifications can be derived by those skilled in the art. Accordingly, the spirit of the present disclosure should be determined by only the appended claims, and all equivalents or equivalent variations thereof will fall within the scope of the present disclosure.

What is claimed is:

1. A programmable logic controller (PLC) having a plurality of communication modules, the PLC comprising:
   a control module configured to perform a control operation according to a preset program;
   a first communication module configured to transmit a control command from the control module to at least one of first external devices; and
   a second communication module configured to transmit the control command from the control module to at least one of second external devices and,
   wherein the first and second communication modules transmit external data to the control module via a data transmission cable which is shared by the first and second communication modules, and
   wherein the first and second communication modules check interrupt signals therebetween to alternately transmit the external data to the control module, respectively.

2. The PLC of claim 1, wherein the control module has a single data receiving port, and alternately receives the external data from the first and second communication modules and via the data transmission cable connected to a single data receiving port.

3. The PLC of claim 2, wherein the first communication module monitors the interrupt signal in a wait mode when the interrupt signal is being input from the second communication module, generates an interrupt signal to provide the generated interrupt signal to the second communication module when the interrupt signal is not applied from the second communication module, and then transmits the external data to the control module via the shared data transmission cable during a period in which the generated interrupt signal is supplied.

4. The PLC of claim 2, wherein the second communication module monitors the interrupt signal in a wait mode when the interrupt signal is being input from the first communication module, generates an interrupt signal to provide the generated interrupt signal to the first communication module when the interrupt signal is not applied from the first communication module, and then transmit the external data to the control module via the shared data transmission cable during a period in which the generated interrupt signal is supplied.

5. The PLC of claim 1, wherein the control module includes:
   a single data receiving port electrically connected to the data transmission cable and configured to receive the external data; and
   a central processing unit configured to store the external data input through the single data receiving port, execute the preset program using the external data, and provide the control command to the first or second communication module to control the first and second external devices.

6. The PLC of claim 5, wherein the first communication module includes:
   a first data communication port electrically connected to the data transmission cable and configured to allow the external data to be transmitted via the data transmission cable;
   a first interrupt port configured to receive an interrupt signal from the second communication module or generate an interrupt signal to supply the interrupt signal to the second communication module; and
   a first micro controller unit configured to monitor the interrupt signal input from the second communication module through the first interrupt port or generate the interrupt signal to supply the generated interrupt signal to the second communication module, and control the external data to be transmitted to the data transmission cable through the first data communication port.

7. The PLC of claim 5, wherein the second communication module includes:
   a second data communication port electrically connected to the data transmission cable and configured to allow the external data to be transmitted via the data transmission cable;
   a second interrupt port configured to receive an interrupt signal from the first communication module or generate an interrupt signal to supply the interrupt signal to the first communication module; and
   a second MCU configured to monitor the interrupt signal input from the first communication module through the second interrupt port or generate the interrupt signal to supply the generated interrupt signal to the first communication module, and control the external data to be transmitted to the data transmission cable through the second data communication port.

* * * * *